(12) United States Patent
Steely, Jr. et al.

(10) Patent No.: US 8,438,335 B2
(45) Date of Patent: May 7, 2013

(54) PROBE SPECULATIVE ADDRESS FILE

(75) Inventors: Simon C. Steely, Jr., Hudson, NH (US); William C. Hasenplaugh, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 12/892,476

(22) Filed: Sep. 28, 2010

(65) Prior Publication Data

US 2012/0079208 A1    Mar. 29, 2012

(51) Int. Cl.
*G06F 12/00* (2006.01)

(52) U.S. Cl.
USPC ............... 711/118; 711/141; 711/E12.001; 711/E12.026

(58) Field of Classification Search ............ 711/118, 711/141, E12.001, E12.026
See application file for complete search history.

(56) References Cited

U.S. PATENT DOCUMENTS

| | | | | |
|---|---|---|---|---|
| 5,923,855 | A | * | 7/1999 | Yamazaki ............ 709/248 |
| 8,195,887 | B2 | * | 6/2012 | Hughes et al. ............ 711/135 |
| 2007/0143340 | A1 | * | 6/2007 | Lee et al. ............ 707/103 R |

OTHER PUBLICATIONS

Luis Ceze et al., BulkSC. Bulk Enforcement of Sequential Consistency, Jun. 9-13, 2007, p. 278-289, Department of Computer Science, University of Illinois.

* cited by examiner

*Primary Examiner* — Yong Choe
(74) *Attorney, Agent, or Firm* — Trop, Pruner & Hu, P.C.

(57) ABSTRACT

An apparatus to resolve cache coherency is presented. In one embodiment, the apparatus includes a microprocessor comprising one or more processing cores. The apparatus also includes a probe speculative address file unit, coupled to a cache memory, comprising a plurality of entries. Each entry includes a timer and a tag associated with a memory line. The apparatus further includes control logic to determine whether to service an incoming probe based at least in part on a timer value.

18 Claims, 4 Drawing Sheets

PROBE SPECULATIVE ADDRESS FILE

FIELD OF THE INVENTION

Generally, embodiments of the invention relate to integrated electronics and integrated electronics systems. More specifically, embodiments of the invention relate to methods and apparatuses for memory coherency.

BACKGROUND OF THE INVENTION

With multiprocessors gaining more popularity in new computer system designs, there is a growing expectation that parallel programming will become more popular. Parallel programming requires programmers to understand the effects of the memory consistency model supported by a computer system on program behavior. Memory consistency model specifies the orderings of load operations and store operations occur when several processes are accessing a set of memory locations. Memory synchronization is required to ensure the instructions are correctly executed and producing accurate results.

Moreover, in multiprocessors with multiple processing cores, a core may execute instructions in chunks atomily. Such multiprocessors will have to handle the situation when two instruction chunks on different processing cores are interfering with each other. In some solutions, a processing core aborts a presently executing instruction chunk when an interfering event is detected. However, such method may lead to further memory reliance issues, such as, for example, livelock and data starvation.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

An apparatus to resolve cache coherency is presented. In one embodiment, the apparatus includes a microprocessor comprising one or more processing cores. The apparatus includes a probe speculative address file unit, coupled to a memory, comprising a plurality of entries. Each entry includes a timer and a tag associated with a memory line. The apparatus further includes control logic to determine whether to service an incoming probe based at least in part on a timer value.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
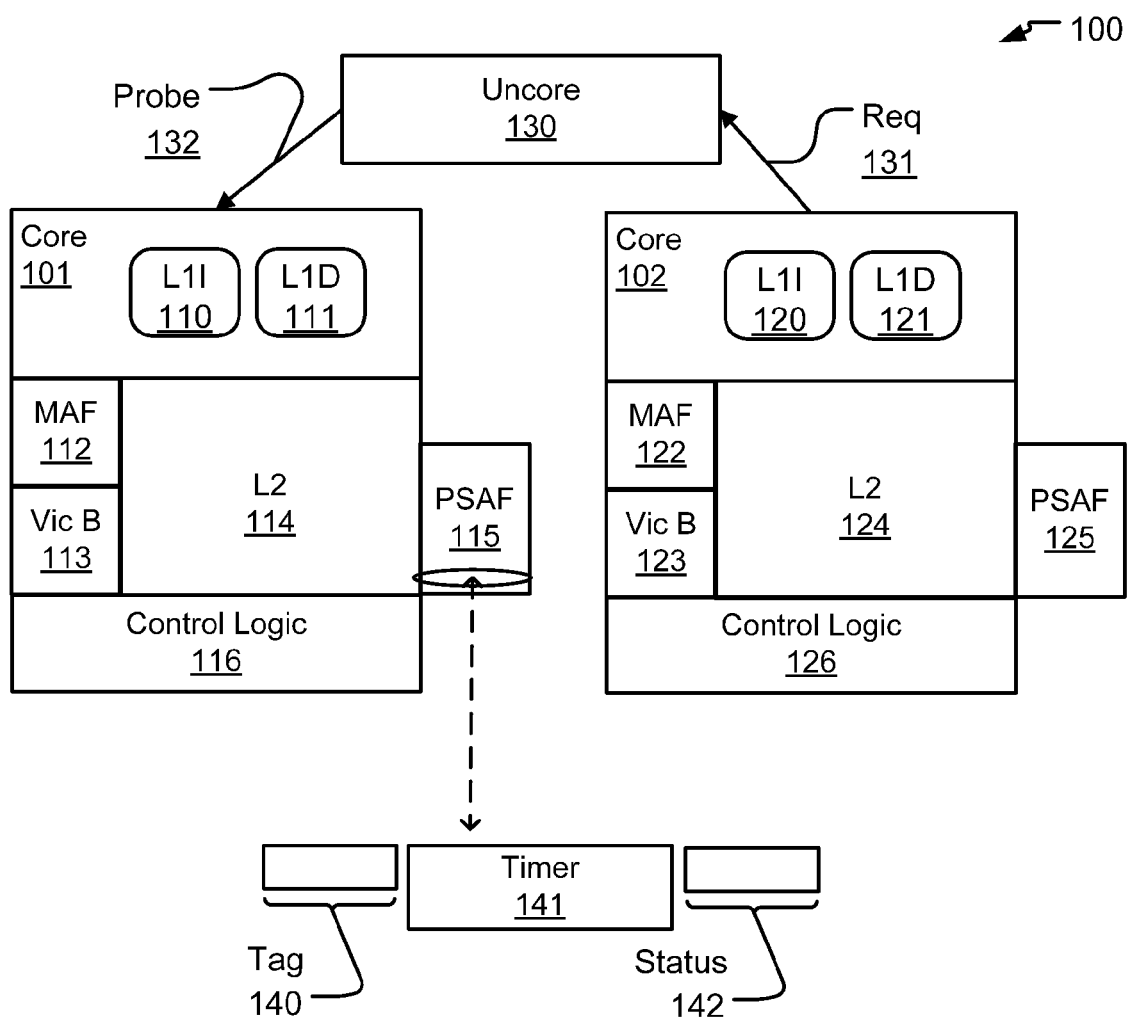
FIG. 1 shows a memory system including L2 cache memories and probe speculative address file units.

FIG. 1 shows a memory system including L2 cache memories and probe speculative address file units. Referring to FIG. 1, in one embodiment, the memory system comprises processing cores 101-102 and uncore 130. In one embodiment, uncore 130 includes components of a platform including, but not limited, interconnects, graphics engines, memory management components, input/output controllers, or, any combinations thereof.

In one embodiment, processing core 101 further includes level 1 instruction cache 110 and level 1 data cache 111. Processing core 101 is couple to level 2 cache 114 (L2 114). L2 114 comprises miss address file 112 (MAF 112), victim buffer 113, probe speculation address file 115, and control logic 116.

In one embodiment, processing core 102 further includes level 1 instruction cache 120 and level 1 data cache 121. Processing core 102 is couple to level 2 cache 124 (L2 124). L2 124 comprises miss address file 122 (MAF 122), victim buffer 123, probe speculation address file 125, and control logic 126.

In one embodiment, the aforementioned units are shown as discrete components. Other embodiments are possible where some or all of these units are integrated within a device or within other components. In other embodiments, the aforementioned units are distributed throughout a system in hardware, software, or some combination thereof. In one embodiment, processing core 101, processing core 102, uncore 130, L2 114, and L2 124 are parts of a processor.

In one embodiment, a processor executes sets of consecutive instruction referred to herein as instruction chunks. An instruction chunk (chunk) is performed in the manner that each chunk appears to execute atomicly and in isolation. Instructions in an instruction chunk may include dynamic instructions and static instructions. Executing instructions in chunks provides the ability to optimize core pipeline for better efficiency. In one embodiment, all operations of an instruction chunk are either perceived as completed or not started if the instruction chunk is executed in an atomic manner.

In one embodiment, probes are short messages carrying miss or invalidation requests and, typically, block address fields and other control/routing information.

In one embodiment, interfering happens when at least one of the processing cores is writing a memory line and another processing core is accessing the same memory line. For example, interfering occurs when processing core 101 is accessing a memory line and processing core 102 is writing the same memory line. An interfering event is also referred to herein as interference. In one embodiment, accessing a memory line includes an operation to read the memory line, to write the memory line, or the like.

In one embodiment, an interference event is recognized because a probe is delivered to a processing core and the probe matches one of the memory lines that a presently executing chunk has speculatively accessed. In one embodiment, speculatively accessed memory lines include all memory lines that are accessed in the process of executing a chunk of instructions until the chunk is completed.

In one embodiment, L2 114 is incorporated with probe speculative address file 115. Probe speculative address file 115 is a memory structure which contains multiple entries. Each entry includes a tag (e.g., tag 140) that can be associated with a memory line which the tag represents. Each entry also includes a count-down timer (e.g., timer 141) that determines how long the entry will be delayed before the entry has to be serviced. In one embodiment, an entry also includes status information (e.g., status 142).

In one embodiment, a group of entries are associated with a timer. The timer is set in response to the allocation of the first entry among the group of entries. The timer value is used by the group of entries. In one embodiment, probe speculative address file 115 includes only one timer. All entries in probe speculative address file 115 are associated with the timer which is set in response to the first entry allocated. The timer value will be used by all the entries in probe speculative address file 115.

In one embodiment, request 131 from processing core 102 is propagated to processing core 101 via uncore 130. Control logic 116, in conjunction with L2 114, detects that an interference event occurs if incoming probe 132 matches a speculative memory line accessed by an executing instruction chunk. In one embodiment, the instruction chunk is not aborted immediately. Control logic 116 allocates an entry in probe speculative address file 115 to store incoming probe 132. Count-down timer 141 starts to count down.

In one embodiment, if the instruction chunk completes and is able to commit (atomicly) its memory accesses into the memory system, probe 132 is then serviced. If count-down timer 141 expires (e.g., the timer counts to zero), the instruction chunk will be aborted. In one embodiment, this delay mechanism may eliminate some starvation and live-lock situations.

In one embodiment, aborting an instruction chunk includes operations to restore execution to a point before any instruction of the instruction chunk has started. In one embodiment, such operations include, but not limited to, restoring register values and memory values to their previous states.

In one embodiment, if a chunk is repeatedly aborted, a processing core reduces the size of the instruction chunk (e.g., the number of instructions in the chunk) and tries to execute the instruction chunk. It is possible to reduce the instruction chunk to a single instruction execution.

In one embodiment, probe speculative address file 115 is also used for memory protection for a short time period. For example, in one embodiment, processing core 101 protects a memory line so that processing core 101 can perform multiple actions (either read or write operations) on the memory line. Probe speculative address file 115 provides memory locations to hold any probes arriving to the memory line. If another processing core accesses the same memory line and if the probe is processed, repeated memory blocking could happen due to cache-coherency protocols. Probe speculative address file 115 provides a mechanism to delay a probe temporarily while other probes are processed. In one embodiment, probe speculative address file 115 is able to store more than one incoming probes associated with a same memory line.

In a computer system with a large number of processing cores (e.g., 64-256), the system supports two-sided communication mechanisms between processing cores. In one embodiment, two-sided communication mechanisms are used to support parallel programming paradigms like OpenMP.

In one embodiment, control logic 116 handles two-sided communication (e.g., communication between processor cores 101-102). For example, if a send command arrives, control logic 116 searches MAF 112 for a matching receive command. If a matching receive command is found, the communication is deemed complete. If a matching receive command does not exist in MAF 112, the send command will be delayed until a receive command is issued. In one embodiment, control logic 116 allocates an entry in probe speculative address file 115 in response to the send command. The entry will be held until a matching receive command is issued by processing core 101. In one embodiment, count-down timer 141 will be used to determine whether to abort the send command if the two-sided communication cannot be completed.

It will be appreciated by those skilled in the art that these count-down timers may be replaced with count-up timers, counters, and other counting devices with some adaptation. In one embodiment, the initial value of count-down timer 141 is a system-defined value, a predetermined value, a user-input value, or a combination thereof.

The method and apparatus described herein is primarily discussed in reference to a Level 2 cache. However, the method and apparatus may be implemented on or in association with level 1 cache, level 3 cache, or any other cache memory. In addition to multi-core processor computer systems, the method and apparatus may be implemented on or in association with any integrated circuit device or system, such as cell phones, personal digital assistants, embedded controllers, mobile platforms, desktop platforms, and server platforms, as well as in conjunction with other resources, such as hardware/software threads. Moreover, the method and apparatus may be implemented in conjunction with a memory region, a memory block, a memory line, or any combinations thereof.

Figure 2:
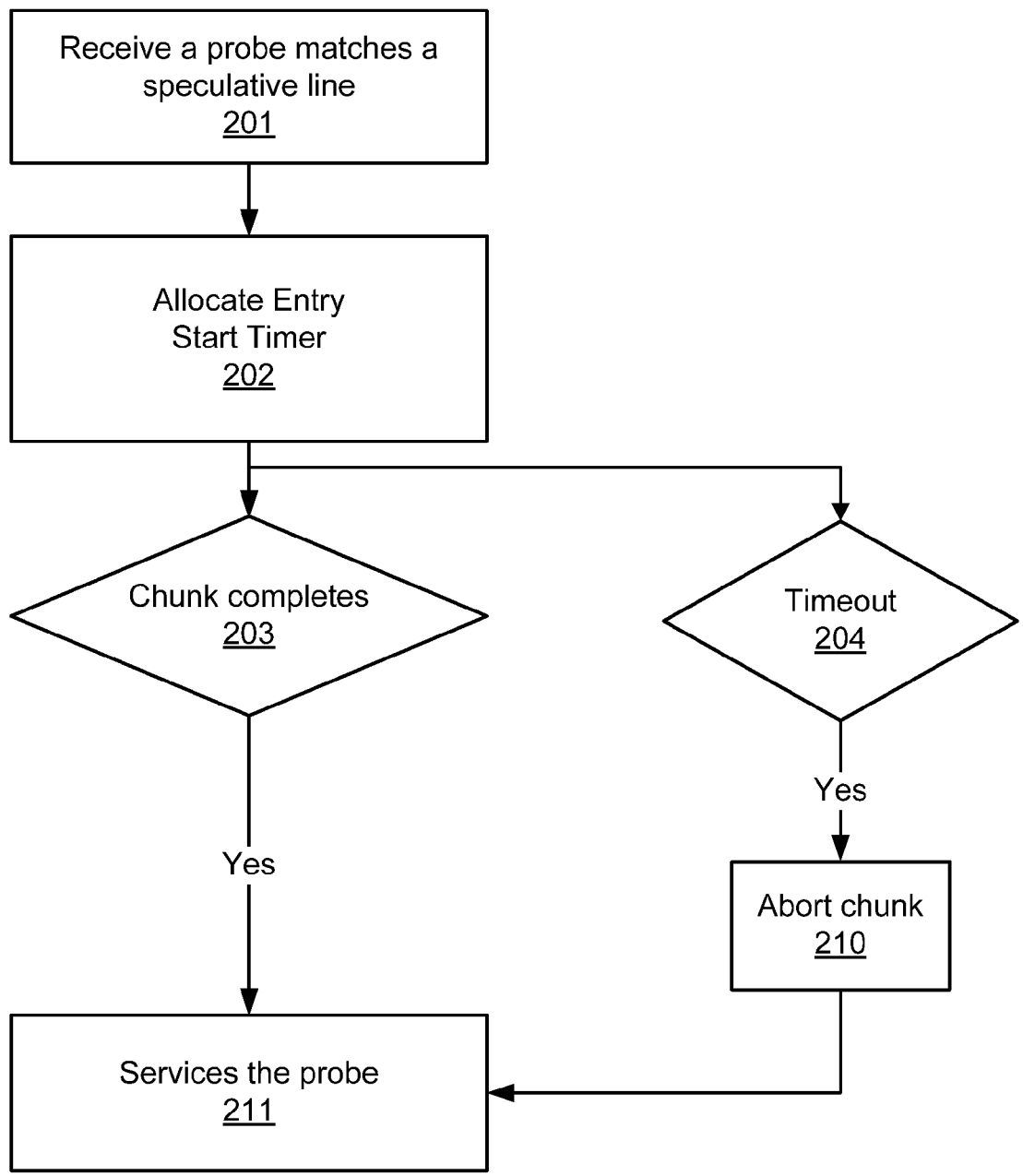
FIG. 2 is a flow diagram of one embodiment of a process to manage an incoming probe.

FIG. 2 is a flow diagram of one embodiment of a process to manage an incoming probe. The process is performed by processing logic that may comprise hardware (circuitry, dedicated logic, etc.), software (such as one that is run on a general purpose computer system or a dedicated machine), or a combination of both. In one embodiment, the process is performed in conjunction with a probe speculative address file (e.g., probe speculative address file 115 with respect to FIG.

1). In one embodiment, the process is performed by a computer system with respect to FIG. 4.

Referring to FIG. 2, in one embodiment, processing logic begin by receiving a probe (process block 201). Processing logic determines whether the probe matches a speculative memory line associated with an instruction chunk (e.g., accessed by an instruction in the chunk). Processing logic allocates an entry in probe speculative address file and store the probe into the entry. Processing logic starts a timer associated with the entry (processing block 202). In one embodiment, each entry includes a timer and a tag which can be associated with a memory line.

In one embodiment, processing logic determines whether an instruction chunk has completed (process block 203). If the instruction chunk completes and is able to commit its memory accesses into the memory system, the probe will be serviced (process block 211).

In one embodiment, processing logic determines whether or not the timer has expired (e.g., the timer counts to zero) (process block 204). If the timer has expired, processing logic aborts the instruction chunk (process block 210).

In one embodiment, if processing logic aborts the instruction chunk, the probe will be serviced in conjunction with the prior states (values) of registers and memory. If the instruction chunk completes before the timer expires, the probe will be serviced in conjunction with register values and memory values committed by the instruction chunk.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 3:
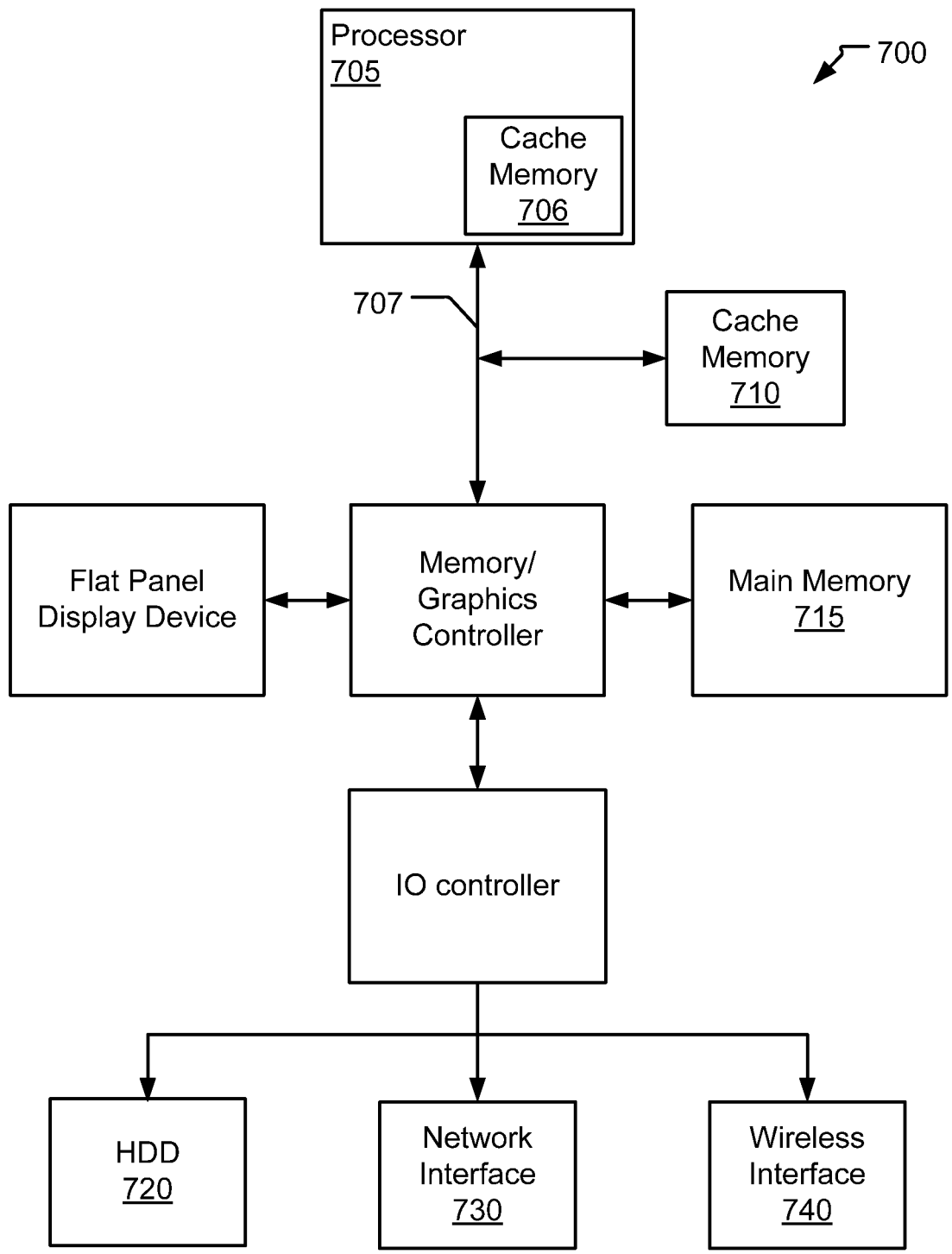
FIG. 3 illustrates a computer system for use with one embodiment of the present invention.

FIG. 3, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 3. Furthermore, in other embodiments of the invention may be distributed throughout several circuits, logic units, or devices illustrated in FIG. 3.

Similarly, at least one embodiment may be implemented within a point-to-point computer system. FIG. 8, for example, illustrates a computer system that is arranged in a point-to-point (PtP) configuration. In particular, FIG. 8 shows a system where processors, memory, and input/output devices are interconnected by a number of point-to-point interfaces.

Figure 4:
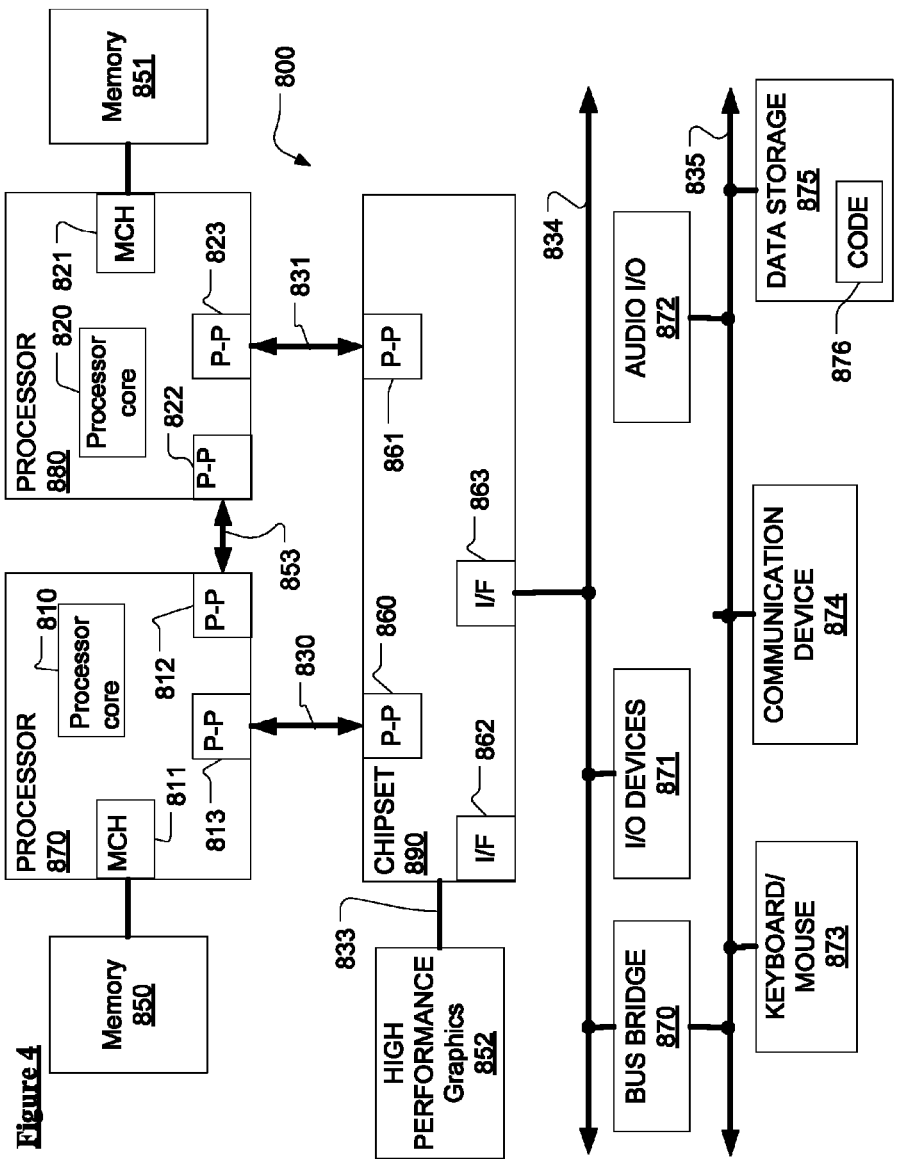
FIG. 4 illustrates a point-to-point computer system for use with one embodiment of the invention.

The system of FIG. 4 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or within data storage 875, or within memory 850 of FIG. 4.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A system comprising:
a microprocessor including one or more processing cores;
a cache memory;
a probe speculative address file unit comprising a plurality of entries, wherein each entry includes a timer and a tag associated with a memory line; and
control logic to determine whether to service an incoming probe based at least in part on the timer.

2. The system of claim 1, wherein the control logic is to store the incoming probe matching a speculative memory line into an entry of the probe speculative address file unit to delay aborting a group of instructions associated with the speculative memory line.

3. The system of claim 2, wherein the control logic is to abort the group of instructions if the timer of the entry decreases to a predetermined value.

4. The system of claim 2, wherein the control logic is operable to store two or more incoming probes associated with a same memory line into the probe speculative address file unit.

5. The system of claim 2, wherein a first processing core of the one or more processing cores is coupled to use the cache memory, wherein the control logic is operable to store an incoming send command into the probe speculative address file unit until a receive command corresponding to the send command is issued by the first processing core.

6. An apparatus comprising:
a memory;
a probe speculative address file unit comprising a plurality of entries including a first entry, wherein the first entry includes a first timer value and a first tag associated with a memory line; and
control logic to determine whether to service an incoming probe based at least in part on the first timer value.

7. The apparatus of claim 6, wherein the first timer value is associated with a value from a count-down timer.

8. The apparatus of claim 6, wherein each entry of the plurality of entries comprises a counter-down timer and a tag associated with a memory line.

9. The apparatus of claim 6, wherein the control logic is operable to process the incoming probe and to determine whether the incoming probe matches a speculative memory line.

10. The apparatus of claim 9, wherein an instruction chunk associated with the speculative memory line is not aborted and the control logic is to store the incoming probe into the first entry.

11. The apparatus of claim 10, wherein the control logic is to abort the instruction chunk if the first timer value decreases to a predetermined value.

12. The apparatus of claim 11, wherein the predetermined value is zero.

13. The apparatus of claim 6, the control logic is operable to store two or more incoming probes associated with a same memory line in the probe speculative address file unit.

14. The apparatus of claim 6, further comprising a first processing core coupled to use the memory, wherein the control logic is operable to store an incoming send command in the probe speculative address file unit until a receive command corresponding the send command is issued by the first processing core.

15. A method comprising:
determining whether an incoming probe is associated with a memory line;
storing the incoming probe into an entry of a probe speculative address file unit, wherein the entry includes a first timer and a first tag associated with the memory line; and
determining, based at least in part on the first timer, when to service the incoming probe.

16. The method of claim 15, further comprising aborting an instruction chunk associated with the memory line if the first timer decreases to a predetermined value.

17. The method of claim 15, further comprising storing an incoming send command in the probe speculative address file unit until a corresponding receive command is issued by a processing core.

18. The method of claim 15, wherein the probe speculative address file unit is operable to store two or more incoming probes associated with a same memory line.

* * * * *